Figure 1:
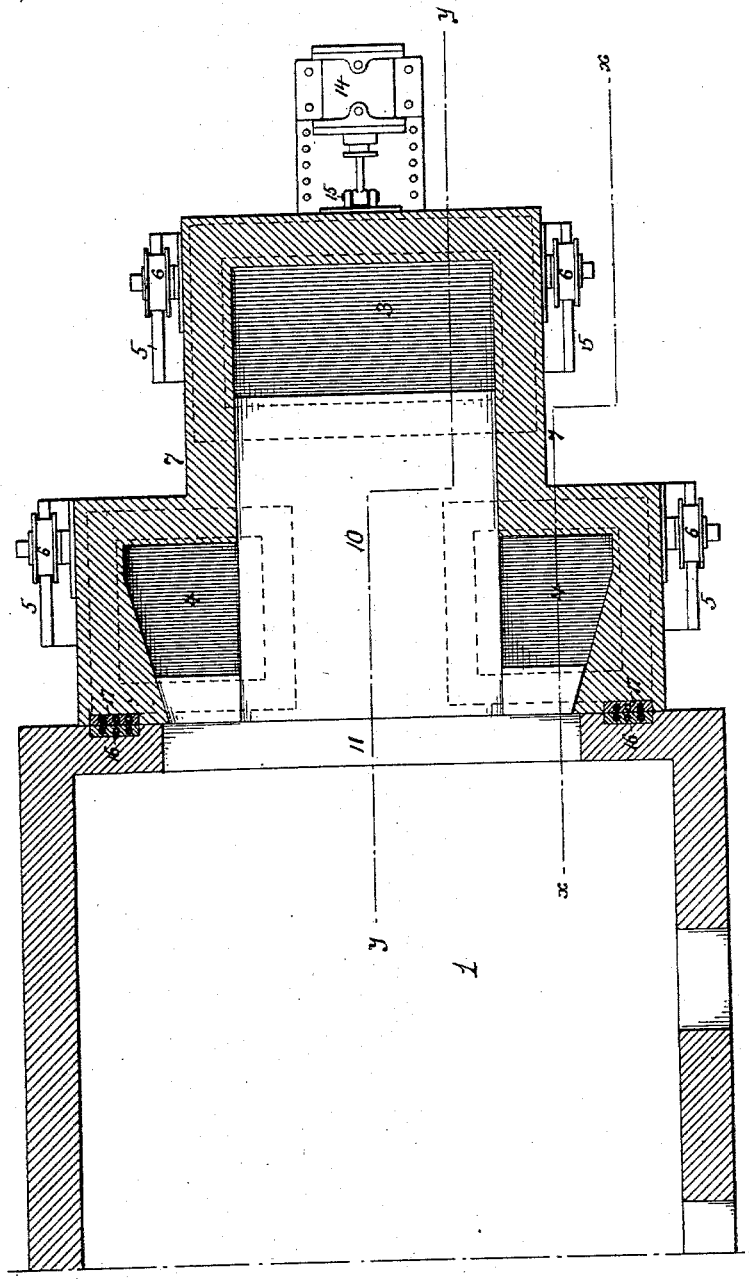

(No Model.) 2 Sheets—Sheet 1.

S. T. & C. H. WELLMAN.
PORT END FOR METALLURGICAL FURNACES.

No. 589,769. Patented Sept. 7, 1897.

Witnesses:
Hamilton D. Turner
F. E. Bechtold

Inventors
Samuel T. Wellman and
Charles H. Wellman
by their Attorneys
Howson & Howson

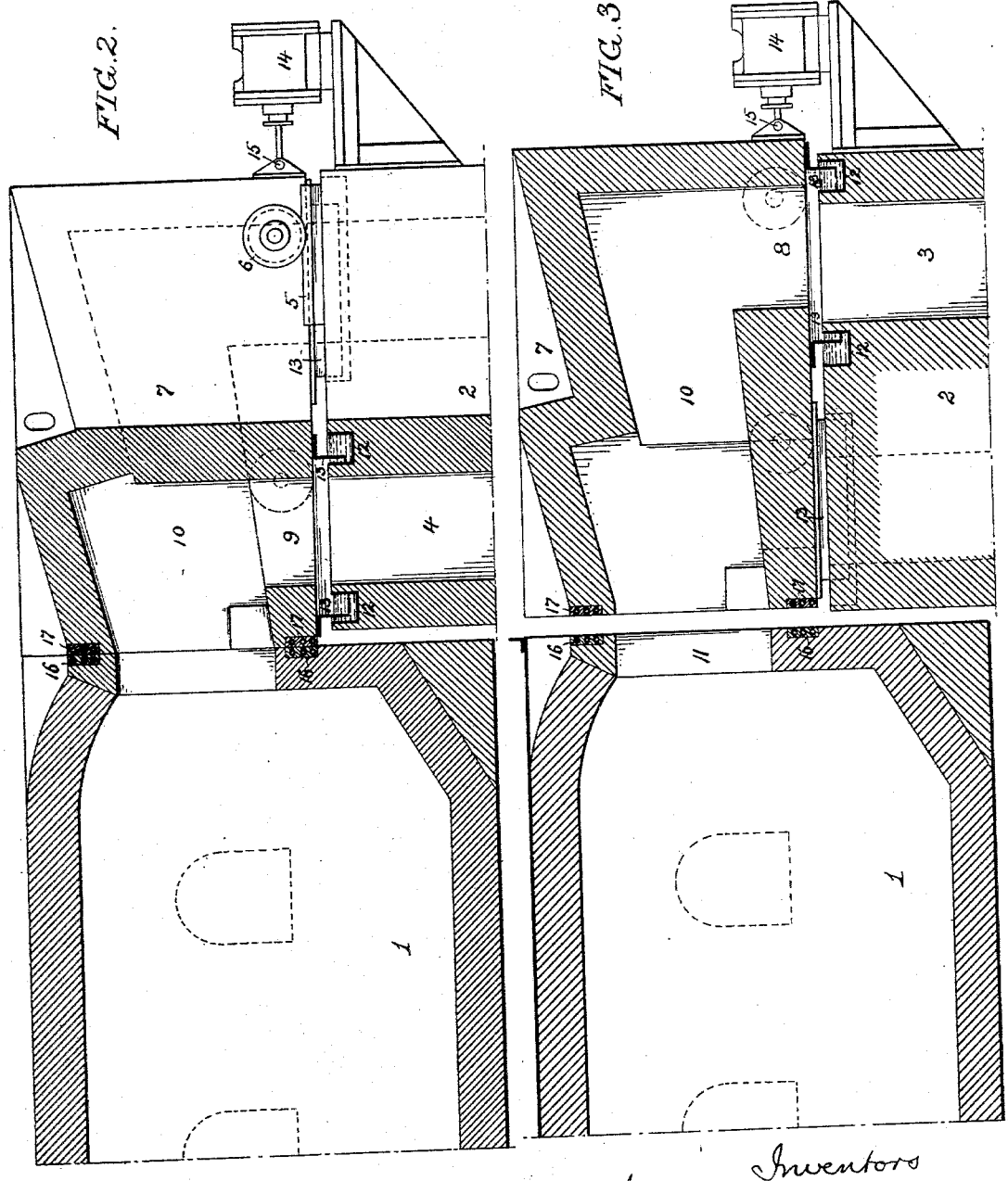

UNITED STATES PATENT OFFICE.

SAMUEL T. WELLMAN AND CHARLES H. WELLMAN, OF CLEVELAND, OHIO.

PORT END FOR METALLURGICAL FURNACES.

SPECIFICATION forming part of Letters Patent No. 589,769, dated September 7, 1897.

Application filed March 15, 1897. Serial No. 627,599. (No model.)

*To all whom it may concern:*

Be it known that we, SAMUEL T. WELLMAN and CHARLES H. WELLMAN, citizens of the United States, and residents of Cleveland, Ohio, have invented certain Improvements in Port Ends for Metallurgical Furnaces, of which the following is a specification.

The object of our invention is to so construct the port end of a metallurgical furnace as to reduce to a minimum the amount of brick exposed to the outgoing gases and to provide for the ready renewal of the port end without cooling off the furnace. This object we attain in the manner hereinafter set forth, reference being had to the accompanying drawings, in which—

Figure 1 is a sectional plan view of sufficient of a metallurgical furnace to illustrate our present invention. Fig. 2 is a longitudinal section of the same on the line $x\,x$, Fig. 1; and Fig. 3 is a longitudinal section on the line $y\,y$, Fig. 1, but illustrating the port end in a different position in respect to the body of the furnace.

In melting or other metallurgical furnaces where high temperature is necessary great trouble is experienced in keeping up the brickwork in the port ends of the furnace—that is to say, those portions of the furnace containing the passages through which the air and gas are conveyed to the furnace from the regenerators or through which the products of combustion escape—the brickwork being rapidly destroyed, partly because of the intense heat of the gases and partly because of the wearing action of the same. The ordinary process of making repairs is expensive not only because of the amount of new brick required, but also on account of the length of time the furnace is idle, a long time being necessary in order to cool down the furnace sufficiently in order to allow the workmen to get inside of it and an equally long time being required to get the furnace up to working heat again after the necessary repairs have been made.

Our invention therefore has been designed with the view of exposing as small an amount of brick as possible to the action of heat and to provide for the ready removal of the entire port end and the substitution of a new one therefor, an operation which can be effected in a few minutes and without any appreciable reduction in the temperature of the furnace.

Our invention is also especially applicable to that class of furnaces in which the body of the furnace is mounted so as to tip or roll upon a supporting-bed, since the port end can make a close joint with the body of the furnace during the operation of the same, but can be slightly withdrawn so as not to interfere with the free tipping or rolling of the body of the furnace when it is desired to discharge the contents of the same.

In the drawings, 1 represents part of the body of the furnace, and 2 a permanent structure erected adjacent to the end of the same and having therein a gas-flue 3 and side air-flues 4. On this permanent structure are tracks 5, upon which run grooved wheels 6, carried by a movable port structure 7, which has ports 8 and 9, forming, respectively, continuations of the flues 3 and 4 of the permanent structure 2, said ports 8 and 9 uniting in a common central flue 10, which discharges into the furnace through the end opening or neck 11 of the same.

The movable port structure 7 is mounted so that it is free from contact with the permanent structure 2, and in order to form a gas-tight joint between the two the upper end of each of the flues 3 and 4 is surrounded by a water-trough 12, into which dips a depending flange 13, surrounding the corresponding port of the movable structure and thus forming a water-seal for said port-end flue.

The movable port structure can be moved back and forth on its supports by means of a hydraulic or other power cylinder 14, the piston-rod of which is connected by a detachable pin 15 to a bracket on said movable port structure. Hence on removing the pin the port structure can be readily freed from connection with the piston-rod.

The end of the furnace 1 has a water-cooled ring 16, and the inner end of the port structure 7 has a corresponding water-cooled ring 17, so that when the port structure is moved into contact with the end of the furnace the meeting portions are kept comparatively cool and are prevented from being united by the fusing of the bricks of which they are composed.

When the furnace is in operation, the inner end of the movable port structure is in contact with the end of the furnace, so as to prevent the escape of gas at the joint between the two, as shown in Figs. 1 and 2; but when it is desired to tip or tilt the body of the furnace the movable port structure is withdrawn slightly, as shown in Fig. 3, so as not to interfere with this movement.

It will be observed that the movable port structure of the furnace contains only a small amount of brickwork, and when this brickwork becomes so fused or worn away by the flow of the hot gases as to require renewal the entire structure can, after the removal of the connecting-pin 15, be readily lifted from the permanent flue structure 2 by means of a suitable crane and moved to one side, so as to permit a new port structure to be adjusted into its place, the whole operation requiring but a few minutes and being effected without any material interference with the running of the furnace.

Having thus described our invention, we claim and desire to secure by Letters Patent—

1. The combination of the body of a metallurgical furnace, a permanent flue structure at the end of the same, a port structure mounted above said permanent flue structure and having ports corresponding with the flues of the same, means for moving the port structure from and toward the body of the furnace, and water-sealed flanges surrounding the ports of the port structure and playing in the sealing-troughs as said port structure is moved back and forth, substantially as specified.

2. The combination of the body of the furnace, a permanent flue structure at the end of the same, a port structure mounted so as to be movable back and forth above said permanent flue structure, and an operating-cylinder having a piston-rod with detachable connection with said movable port structure, substantially as specified.

In testimony whereof we have signed our names to this specification in the presence of two subscribing witnesses.

SAMUEL T. WELLMAN.
CHARLES H. WELLMAN.

Witnesses:
JOHN M. GEORGE,
CHARLES W. COMSTOCK.